United States Patent
Roy et al.

(10) Patent No.: US 12,362,795 B2
(45) Date of Patent: Jul. 15, 2025

(54) BI-DIMENSIONAL STEERING MATRIX ALIGNMENT AT BEAMFORMER

(71) Applicant: NXP USA, INC., Austin, TX (US)

(72) Inventors: Sayak Roy, Kolkata (IN); Ankit Sethi, Pune (IN); Sudhir Srinivasa, Los Gatos, CA (US)

(73) Assignee: NXP USA, Inc., Austin, TX (US)

( * ) Notice: Subject to any disclaimer, the term of this patent is extended or adjusted under 35 U.S.C. 154(b) by 112 days.

(21) Appl. No.: 18/475,279

(22) Filed: Sep. 27, 2023

(65) Prior Publication Data

US 2025/0055518 A1    Feb. 13, 2025

(30) Foreign Application Priority Data

Aug. 8, 2023    (IN) .............................. 202341053252

(51) Int. Cl.
*H04B 7/0456*    (2017.01)
*H04B 7/06*    (2006.01)
*H04L 25/02*    (2006.01)

(52) U.S. Cl.
CPC ......... *H04B 7/0478* (2013.01); *H04B 7/0626* (2013.01); *H04L 25/0202* (2013.01)

(58) Field of Classification Search
CPC .. H04B 7/0478; H04B 7/0626; H04L 25/0202
See application file for complete search history.

(56) References Cited

U.S. PATENT DOCUMENTS

| | | | | |
|---|---|---|---|---|
| 8,644,368 | B1 * | 2/2014 | Zhang | H04B 7/0456 455/39 |
| 8,781,020 | B1 * | 7/2014 | Lee | H04B 7/0665 375/267 |
| 2007/0268181 | A1 * | 11/2007 | Howard | H04L 1/0675 342/368 |
| 2012/0293370 | A1 | 11/2012 | Su et al. | |
| 2013/0028341 | A1 * | 1/2013 | Ayach | H04B 7/0639 375/267 |

(Continued)

FOREIGN PATENT DOCUMENTS

EP        3304765 B1    4/2021

OTHER PUBLICATIONS

Jeon, et al., "Joint Beamformer and Beamformee Design for Channel Smoothing in WLAN Systems," 2020 IEEE 92nd Vehicular Technology Conference, Nov. 18, 2020, 6 pages.

(Continued)

*Primary Examiner* — Jaison Joseph (57) ABSTRACT

A transmitter, including: a plurality of antennas; and a controller configured to: receive a first steering matrix for a first feedback tone; receive a second steering matrix for a second feedback tone; estimate an ideal second steering matrix including: estimating a set of random phasors applied to the columns of the second feedback matrix; and estimating a set of row-dependent delays applied to the rows of the second feedback matrix; estimate a vector of angles based upon the estimated set of random phasors; and calculate a steering matrix for a tone between the first feedback tone and the second feedback tone by interpolating between the first steering matrix and the ideal second steering matrix based upon the estimated vector of angles.

20 Claims, 3 Drawing Sheets

(56) References Cited

U.S. PATENT DOCUMENTS

| | | | | |
|---|---|---|---|---|
| 2013/0272439 A1* | 10/2013 | Zhang | .................. | H04B 7/0634 |
| | | | | 375/267 |
| 2018/0323846 A1* | 11/2018 | Tsai | ..................... | H04B 7/0617 |
| 2025/0055518 A1* | 2/2025 | Roy | ..................... | H04B 7/0634 |

OTHER PUBLICATIONS

Yan, et al., "Accuracy and Compression of TXBF Feedbacks based on the Optimal SVD," IEEE 802.11-22/1820r0, Oct. 27, 2022, 17 pages.

Jeon, et al., "Channel Information Feedback for Smooth Beamforming," IEEE 801.11-22/1842r0, Nov. 3, 2022, 13 pages.

* cited by examiner

BI-DIMENSIONAL STEERING MATRIX ALIGNMENT AT BEAMFORMER

CROSS-REFERENCE TO RELATED APPLICATIONS

This application claims the priority under 35 U.S.C. § 119 of India patent application No. 202341053252, filed on 8 Aug. 2023, the contents of which are incorporated by reference herein.

FIELD OF THE DISCLOSURE

Various exemplary embodiments disclosed herein relate to bi-dimensional steering matrix alignment at a beamformer.

BACKGROUND

An ever-increasing number of relatively inexpensive, low power wireless data communication services, networks and devices have been made available over the past number of years, promising near wire speed transmission and reliability. Various wireless technology is described in detail in the 802.11 IEEE Standard, including for example, the IEEE Standards 802.11n, 802.11ac, 802.11ax, and 802.11be (now in the process of being adopted), all of which are collectively incorporated herein fully by reference for all purposes.

Generally speaking, transmission systems compliant with the various IEEE 802.11 standards achieve their high data transmission rates using Orthogonal Frequency Division Modulation (OFDM) or OFDM encoded symbols mapped up to a 4096 quadrature amplitude modulation (QAM) multi-carrier constellation. The use of OFDM divides the overall system bandwidth into a number of frequency sub-bands or channels, with each frequency sub-band being associated with a respective sub-carrier upon which data is modulated. Thus, each frequency sub-band of the OFDM system is viewed as an independent transmission channel within which to send data, thereby increasing the overall throughput or transmission rate of the communication system.

Generally, transmitters used in the wireless communication systems that are compliant with the aforementioned 802.11 standards as well as other standards such as the IEEE 802.16a Standard, perform multi-carrier OFDM symbol encoding (which include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11 and 802.16a IEEE standards generally include an RF receiving unit that performs RF downconversion and filtering of the received signals (which is performed in one or more stages), and a baseband processor unit that processes the OFDM encoded symbols bearing the data of interest. Generally, the digital form of each OFDM symbol presented in the frequency domain is recovered after baseband down conversion, conventional analog to digital conversion and Fast Fourier Transformation of the received time domain analog signal. Thereafter, the baseband processor performs frequency domain equalization (FEQ) and demodulation to determine the most likely identity of the transmitted symbol. The recovered and recognized stream of symbols is then decoded, which include deinterleaving and error correction using any of a number of known error correction techniques, to produce a set of recovered signals corresponding to the original signals transmitted by the transmitter.

In wireless communication systems, the RF modulated signals generated by the transmitter reaches a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system periodically develops or collects channel state information (CSI) for each of the frequency channels, such as the channels associated with each of the OFDM sub-bands discussed above. Generally speaking, CSI is information defining or describing one or more characteristics about each of the OFDM channels (for example, the gain, the phase and the SNR of each channel). Upon determining the CSI for one or more channels, the receiver sends this CSI back to the transmitter, which uses the CSI for each channel to precondition the signals transmitted using that channel so as to compensate for the varying propagation effects of each of the channels.

An important part of a wireless communication system is therefore the selection of the appropriate data rates, and the coding and modulation schemes to be used for a data transmission based on channel conditions. Generally speaking, it is desirable to use the selection process to maximize throughput while meeting certain quality objectives, such as those defined by a desired frame error rate (FER), latency criteria, etc.

To further increase the number of signals which is propagated in the communication system and/or to compensate for deleterious effects associated with the various propagation paths, and to thereby improve transmission performance, it is known to use multiple transmit and receive antennas within a wireless transmission system. Such a system is commonly referred to as a multiple-input, multiple-output (MIMO) wireless transmission system and is specifically provided for within the 802.11n, 802.11ac, 802.11ax, and 802.11be IEEE standards. Generally speaking, the use of MIMO technology produces significant increases in spectral efficiency and link reliability, and these benefits generally increase as the number of transmission and receive antennas within the MIMO system increases.

In addition to the frequency channels created by the use of OFDM, a MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system experiences different channel conditions (e.g., different fading and multi-path effects) across the overall system bandwidth and therefore achieves different SNRs at different frequencies (i.e., at the different OFDM frequency sub-bands) of the overall system bandwidth. Consequently, the number of information bits per modulation symbol (i.e., the data rate) that is transmitted using the different frequency sub-bands of each spatial channel for a particular level of performance differs from frequency sub-band to frequency sub-band.

However, instead of using the various different transmission and receive antennas to form separate spatial channels on which additional information is sent, better transmission and reception properties can be obtained in a MIMO system by using each of the various transmission antennas of the MIMO system to transmit the same signal while phasing (and amplifying) this signal as it is provided to the various transmission antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better transmission reliability between a particular transmitter and a particular receiver, over that obtained by single transmitter-antenna/receiver-antenna systems.

There are many known techniques for determining a steering matrix specifying the beamsteering coefficients that need to be used to properly condition the signals being applied to the various transmission antennas so as to produce the desired transmit gain pattern at the transmitter. As is known, these coefficients specifies the gain and phasing of the signals to be provided to the transmitter antennas to produce high gain lobes in particular or predetermined directions. These techniques include, for example, transmit-MRC (maximum ratio combining), singular value decomposition (SVD) and Tomlinson-Harashima Precoding (THP). While it is known to perform beamforming in a MIMO system in a manner that uses all of the available receiver and transmitter antennas in the MIMO system, which thereby maximizes transmission reliability, the calculations and processing overhead associated with computing the beamsteering coefficients or the steering matrix increases significantly as the number of transmission and receiver antennas increases. As a result, beamforming in a MIMO system significantly increases the system complexity and processing overhead when a large number of transmission and receiver antennas are present.

Beamforming is conducted explicitly or implicitly. In explicit beamforming, the receiver (or beamformee) feeds back information known (or estimated) about the forward channel to the transmitter (beamformer) in the form of a channel estimation matrix, and the beamformer conducts precoding based on the channel estimation matrix to calculate the steering matrix. Alternatively, the beamformee computes and feeds back the steering matrix (also referred to as the precoding matrix) or the steering matrix index to the beamformer. In implicit beamforming, the beamformer estimates the forward channel based on information known about the reverse channel.

With explicit beamforming, each element of the channel estimation matrix or the precoding matrix is fed back to the beamformer via a feedback channel between the beamformer and beamformee. Generally, the beamformer allocates the bandwidth for the feedback channel based on the number of transmission and receiver antennas. For a large number of transmission and receiver antennas, the channel estimation matrix is large and its values includes complex numbers, thereby increasing the amount of feedback, and utilizing much or all of the allocated bandwidth or otherwise requiring bandwidth allocation sufficient to accommodate the channel estimation matrix. While a precoding matrix requires less feedback than the channel estimation matrix, the number and complexity of the elements still utilizes a large amount of bandwidth in the feedback channel.

SUMMARY

A summary of various exemplary embodiments is presented below.

Various embodiments relate to a transmitter, including: a plurality of antennas; and a controller configured to: receive a first steering matrix for a first feedback tone; receive a second steering matrix for a second feedback tone; estimate an ideal second steering matrix including: estimating a set of random phasors applied to the columns of the second feedback matrix; and estimating a set of row-dependent delays applied to the rows of the second feedback matrix; estimate a vector of angles based upon the estimated set of random phasors; and calculate a steering matrix for a tone between the first feedback tone and the second feedback tone by interpolating between the first steering matrix and the ideal second steering matrix based upon the estimated vector of angles.

Various embodiments are described, wherein estimating a set of random phasors applied to the columns of the second feedback matrix includes estimating a diagonal matrix $\Lambda(1, e^{j\Theta_{k,1}}, \ldots, e^{j\Theta_{k,N}})$ that has unit phasors $1, e^{j\Theta_{k,1}}, \ldots, e^{j\Theta_{k,N}}$ on its diagonal where $\theta_{k,1}$ is a phase angle, k is a tone index, and N is the number rows and columns in the diagonal matrix.

Various embodiments are described, wherein estimating a set of row-dependent delays applied to the rows of the second feedback matrix includes estimating a diagonal matrix $\Lambda(1, e^{j\Phi_1}, \ldots, e^{j\Phi_M})$ having elements $1, e^{j\Phi_1}, \ldots, e^{j\Phi_M}$ on its diagonal where $\phi_M$ is a phase angle and M is the number or rows in columns in the diagonal matrix.

Various embodiments are described, wherein estimating an ideal second steering matrix further includes: initializing a first diagonal matrix; initializing a second diagonal matrix; repeating for $N_{iter}$ number of iterations: calculating a value of the second matrix based upon the first steering matrix, the second steering matrix, and the first matrix; and calculating a value of the first matrix based upon the first steering matrix, the second steering matrix, and the second matrix; and calculating the ideal second beam steering matrix based upon the second steering matrix, a final calculated value of the first matrix, and a final calculated value of the second matrix, wherein the first matrix corresponds to the set of row-dependent delays applied to the rows of the second feedback matrix, and wherein the second matrix corresponds to the set of random phasors applied to the columns of the second feedback matrix.

Various embodiments are described, wherein calculating a value of the second matrix based upon the first steering matrix, the second steering matrix, and the first matrix includes calculating $D_2 = \text{diag}(\exp\{-j \text{ angle}(\text{diag}(Q_k^H D_1 Q_{k+Ng}))\})$, where $D_2$ is the second matrix, $D_1$ is the first matrix, $Q_k^H$ is the conjugate transpose of the first steering matrix, and $Q_{k+Ng}$ is the second steering matrix, calculating a value of the first matrix based upon the first steering matrix, the second steering matrix, and the second matrix includes calculating $D_1 = \text{diag}(\exp\{-j \text{ angle}(\text{diag} (Q_{k+Ng} D_2 Q_k^H))\})$, and calculating the ideal second beam steering matrix based upon the second steering matrix, the first matrix, and the second matrix includes ideal calculating $Q_{k+Ng}^{\overline{ideal}} = D_1^{opt} Q_{k+Ng} D_2^{opt}$, where $Q_{k+Ng}^{\overline{ideal}}$ is the ideal second beam steering matrix, $D_1^{opt}$ is the final value of $D_1$ after the $N_{iter}$ number of iterations, $D_2^{opt}$ the final value of $D_2$ after the $N_{iter}$ number of iterations, and Ng is the number of tones between the first feedback tone and the second feedback tone.

Various embodiments are described, wherein the first matrix and the second matrix are initialized to identity matrices.

Various embodiments are described, wherein the first matrix is initialized to values based upon channel characteristic values and the second matrix is initialized to an identity matrix.

Various embodiments are described, wherein interpolating between the first steering matrix and the ideal second steering matrix based upon the estimated vector of angles is done using a linear interpolation.

Various embodiments are described, wherein calculating a steering matrix for a tone between the first feedback tone and the second feedback tone includes $$Q_{k+r} = \text{diag}\left(\exp\left(j\frac{r}{Ng}\alpha\right)\right) \times \left\{Q_k + \frac{r}{Ng}(\overline{q_{k+Ng}^{ideal}} - Q_k)\right\},$$

where r is an integer so that k+r is the index of the tone between the first feedback tone and the second feedback tone and a is the vector of estimated angles.

Various embodiments are described, wherein estimating the vector of angles based upon the estimated set of random phasors is calculated as $\alpha = -\text{angle}(\text{diag}(D_1^{opt}))$, where a is the vector of estimated angles and $D_1^{opt}$ is a final value of $D_1$ after the $N_{iter}$ number of iterations.

Further various embodiments relate to a method for producing a steering matrix, including: receiving a first steering matrix for a first feedback tone; receiving a second steering matrix for a second feedback tone; estimating an ideal second steering matrix including: estimating a set of random phasors applied to the columns of the second feedback matrix; and estimating a set of row-dependent delays applied to the rows of the second feedback matrix; estimating a vector of angles based upon the estimated set of random phasors; and calculating a steering matrix for a tone between the first feedback tone and the second feedback tone by interpolating between the first steering matrix and the ideal second steering matrix based upon the estimated vector of angles.

Various embodiments are described, wherein estimating a set of random phasors applied to the columns of the second feedback matrix includes estimating a diagonal matrix $\Lambda(1, e^{j\theta_{k,1}}, \ldots, e^{j\theta_{k,N}})$ that has unit phasors $1, e^{j\theta_{k,1}}, \ldots, e^{j\theta_{k,N}}$ on its diagonal where $\theta_{k,1}$ is a phase angle, k is a tone index, and N is the number of rows and columns in the diagonal matrix.

Various embodiments are described, wherein estimating a set of row-dependent delays applied to the rows of the second feedback matrix includes estimating a diagonal matrix $\Lambda(1, e^{j\phi_1}, \ldots, e^{j\phi_M})$ having elements $1, e^{j\phi_1}, \ldots, e^{j\phi_M}$ on its diagonal where $\phi_M$ is a phase angle and M is the number of rows or columns in the diagonal matrix.

Various embodiments are described, wherein estimating an ideal second steering matrix further includes: initializing a first diagonal matrix; initializing a second diagonal matrix; repeating for $N_{iter}$ number of iterations: calculating a value of the second matrix based upon the first steering matrix, the second steering matrix, and the first matrix; and calculating a value of the first matrix based upon the first steering matrix, the second steering matrix, and the second matrix; and calculating the ideal second beam steering matrix based upon the second steering matrix, a final calculated value of the first matrix, and a final calculated value of the second matrix, wherein the first matrix corresponds to the set of row-dependent delays applied to the rows of the second feedback matrix, and wherein the second matrix corresponds to the set of random phasors applied to the columns of the second feedback matrix.

Various embodiments are described, wherein calculating a value of the second matrix based upon the first steering matrix, the second steering matrix, and the first matrix includes calculating $D_2 = \text{diag}(\exp\{-j \text{ angle}(\text{diag}(Q_k^H D_1 Q_{k+Ng}))\})$, where $D_2$ is the second matrix, $D_1$ is the first matrix, $Q_k^H$ is the conjugate transpose of the first steering matrix, and $Q_{k+Ng}$ is the second steering matrix, calculating a value of the first matrix based upon the first steering matrix, the second steering matrix, and the second matrix includes calculating $D_1 = \text{diag}(\exp\{-j \text{ angle}(\text{diag}(Q_{k+Ng} D_2 Q_k^H))\})$, and calculating the ideal second beam steering matrix based upon the second steering matrix, the first matrix, and the second matrix includes calculating $\overline{Q_{k+Ng}^{ideal}} = D_1^{opt} Q_{k+Ng} D_2^{opt}$, where $\overline{Q_{k+Ng}^{ideal}}$ deal is the ideal second beam steering matrix, $D_1^{opt}$ is the final value of $D_1$ after the $N_{iter}$ number of iterations, $D_2^{opt}$ the final value of $D_2$ after the $N_{iter}$ number of iterations, and Ng is the number of tones between the first feedback tone and the second feedback tone.

Various embodiments are described, wherein the first matrix and the second matrix are initialized to identity matrices.

Various embodiments are described, wherein the first matrix is initialized to values based upon channel characteristic values and the second matrix is initialized to an identity matrix.

Various embodiments are described, wherein interpolating between the first steering matrix and the ideal second steering matrix based upon the estimated vector of angles is done using a linear interpolation.

Various embodiments are described, wherein calculating a steering matrix for a tone between the first feedback tone and the second feedback tone includes calculating $$Q_{k+r} = \text{diag}\left(\exp\left(j\frac{r}{Ng}\alpha\right)\right) \times \left\{Q_k + \frac{r}{Ng}(\overline{q_{k+Ng}^{ideal}} - Q_k)\right\},$$

where r is an integer so that k+r is the index of the tone between the first feedback tone and the second feedback tone and $\alpha$ is the vector of estimated angles.

Various embodiments are described, wherein estimating the vector of angles based upon the estimated set of random phasors is calculated as $\alpha = -\text{angle}(\text{diag}(D_1^{opt}))$, where $\alpha$ is the vector of estimated angles and $D_1^{opt}$ is a final value of $D_1$ after the $N_{iter}$ number of iterations.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of beam forming systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with IEEE 802.11 technologies, aspects of the present disclosure can be applied in other generation-based wireless communication systems.

While the beamforming techniques described herein for processing and effecting a wireless data transmission are described as being used in communication systems that use one of the IEEE Standard 802.11x communication standards, these techniques may be used in various other types of wireless communication systems and are not limited to those conforming to one or more of the IEEE Standard 802.11x standards.

Figure 1:
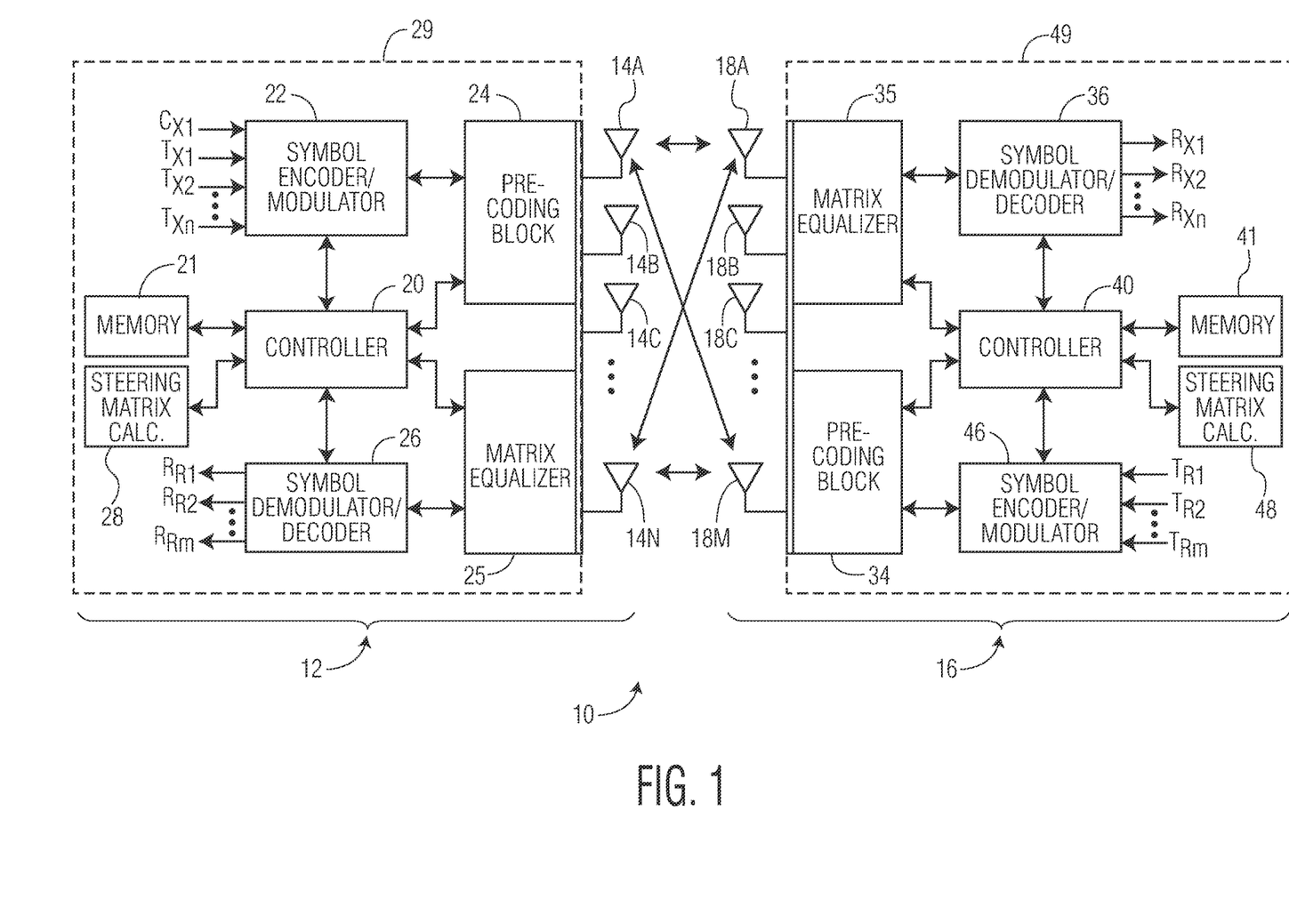
FIG. 1 illustrates an example MIMO communication system in block diagram form as generally including a single transmitter having multiple transmitter antennas and a single receiver having multiple receiver antennas.

Referring now to FIG. 1, a MIMO communication system 10 is illustrated in block diagram form as generally including a single transmitter 12 having multiple transmitter antennas 14A-14N and a single receiver 16 having multiple receiver antennas 18A-18M. The number of transmitter antennas 14A-14N can be the same as, more than, or less than the number of receiver antennas 18A-18M. As shown in FIG. 1, the transmitter 12 may include a controller 20 coupled to a memory 21, a symbol encoder and modulator unit 22, and a precoding block 24 (the precoding block 24 is also referred to herein as a transmit beamforming network). The transmitter 12 may also include a matrix equalizer 25 and a symbol demodulator and decoder unit 26 to perform demodulation and decoding of signals received via the antennas 14A-14N in a receive mode. Additionally, the transmitter 12 includes a steering matrix calculation unit 28. The controller 20 may be any desired type of controller and both the controller 20 and the steering matrix calculation unit 28 may be implemented as one or more standard multi-purpose, programmable processors, such as microprocessors, as application specific integrated circuits (ASICs), etc., or may be implemented using any other desired types of hardware, software and/or firmware. Likewise, the precoding block 24 or beamforming network, and the matrix equalizer 25 may be implemented using known or standard hardware and/or software elements. If desired, various of the transmitter components, such as the controller 20, the modulator unit 22, the demodulator unit 26, the steering matrix calculation unit 28, the precoding block 24 and the matrix equalizer 25 may be implemented in the same or in different hardware devices, such as in the same or different processors. Additionally, each of these components of the transmitter 12 may be disposed in a housing 29 (shown in dotted relief in FIG. 1). Still further, the routines or instructions for implementing the functionality of any of these components may be stored in the memory 21 or within other memory devices associated with the individual hardware used to implement these components.

During operation, information signals $T_{x1}$-$T_{xn}$ which are to be transmitted from the transmitter 12 to the receiver 16 are provided to the symbol encoder and modulator unit 22 for encoding and modulation. Of course, any desired number of signals $T_{x1}$-$T_{xn}$ may be provided to the modulator unit 22, with this number generally being limited by the modulation scheme used by and the bandwidth associated with the MIMO communication system 10. Additionally, the signals $T_{x1}$-$T_{xn}$ may be any type of signals, including analog or digital signals, and may represent any desired type of data or information. Additionally, if desired, a known test or control signal $C_{x1}$ (which may be stored in the memory 21) may be provided to the symbol encoder and modulator unit 22 for use in determining CSI related information describing the characteristics of the channel(s) between the transmitter 12 and the receiver 16. The same control signal or a different control signal may be used to determine the CSI for each frequency and/or spatial channel used in the MIMO communication system 10. The control signal $C_{x1}$ may be referred to as or included within a sounding packet.

The symbol encoder and modulator unit 22 may interleave digital representations of the various signals $T_{x1}$-$T_{xn}$ and $C_{x1}$ and may perform any other known type(s) of error-correction encoding on the signals $T_{x1}$-$T_{xn}$ and $C_{x1}$ to produce one or more streams of symbols to be modulated and sent from the transmitter 12 to the receiver 16. While the symbols may be modulated using any desired or suitable QAM technique, these symbols may be modulated in any other known or desired manner including, for example, using any other desired phase and/or frequency modulation techniques. In any event, the modulated symbol streams are provided by the symbol encoder and modulator unit 22 to the precoding block 24 for processing before being transmitted via the antennas 14A-14N. While not specifically shown in FIG. 1, the modulated symbol streams may be up-converted to the RF carrier frequencies associated with an OFDM technique (in one or more stages) before being processed by the precoding block 24 in accordance with a beamforming technique more specifically described herein. Upon receiving the modulated signals, the precoding block 24 or beamforming network processes the modulated signals by injecting delays and/or gains and/or phase rotations into the modulated signals based on a steering matrix (also referred to as a precoding matrix) provided by the controller 20, to thereby perform beamsteering or beamforming via the transmitter antennas 14A-14N.

The signals transmitted by the transmitter 12 are detected by the receiver antennas 18A-18M and may be processed by a matrix equalizer 35 within the receiver 16 to enhance the reception capabilities of the antennas 18A-18M. As will be understood, the processing applied at the receiver 16 (as well as at the transmitter 12) may be based on, for example, the CSI developed by the receiver 16 in response to the transmission of the test or control signal $C_{x1}$ (i.e., sounding packet). In any event, a symbol demodulator and decoder unit 36, under control of a controller 40, may decode and demodulate the received symbol strings as processed by the matrix equalizer 35. In this process, these signals may be downconverted to baseband. Generally, the matrix equalizer 35 and the demodulator and decoder unit 36 may operate to remove effects of the channel based on the CSI as well as to perform demodulation on the received symbols to produce a digital bit stream. In some cases, if desired, the symbol demodulator and decoder unit 36 may perform error correction decoding and deinterleaving on the bit stream to produce the received signals $R_{x1}$-$R_{xn}$ corresponding to the originally transmitted signals $T_{x1}$-$T_{xn}$.

As shown in FIG. 1, the receiver 16 may also include a memory 41 and a symbol encoder and modulator unit 46 which may receive one or more signals $T_{R1}$-$T_{Rm}$ which may be encoded and modulated using any desired encoding and modulation techniques. The receiver 16 may also provide one or more known test or control signals $C_{R1}$ (not shown) to the symbol encoder/modulator unit 46 to be sent to the transmitter 12 to enable the transmitter 12 to determine a measured description of the reverse channel between the receiver 16 and the transmitter 12. The encoded and modulated symbol stream may then be upconverted and processed by a precoding block 34 to perform beamsteering based on a steering matrix developed by a steering matrix calculation unit 48, prior to being transmitted via the receiver antennas 18A-18N to, for example, the transmitter 12, thereby implementing the reverse link. As shown in FIG. 1, each of the receiver components may be disposed in a housing 49.

The matrix equalizer 25 and the demodulator/decoder unit 26 within the transmitter 12 operate similarly to the matrix equalizer 35 and the demodulator/decoder unit 36 of the receiver 16 to demodulate and decode the signals transmitted by the receiver 16 to produce the recovered signals $R_{R1}$-$R_{Rm}$. Here again, the matrix equalizer 25 may process the received signals in any known manner to enhance the separation and therefore the reception of the various signals transmitted by the antennas 18A-18M. Of course, the CSI or other measured description of the forward channel for the various OFDM channel(s) may be used by the steering matrix calculation units 28 and 48 as well as by the controllers 20 and 40 to perform beamforming and to determine a steering matrix used by the precoding blocks 24, 34. As noted above, the CSI, beamforming and other programs and data such as the steering matrix used by the units 28 and 48 and by the controllers 20 and 40 may be stored in the memories 21 and 41.

As is generally known, when the transmitter 12 sends multiple data streams by multiple transmission antennas 14A-14N, or a subset thereof, to multiple receiver antennas 18A-18M, or a subset thereof, of the receiver 16, the data streams are transmitted through a channel matrix, H, which includes the multiple paths between the transmission antennas 14A-14N and the receive antennas 18A-18M. The receiver 16 obtains the signal vectors from the transmission and decodes the signal vectors into the information of interest. As discussed above, in the case of OFDM, the receiver 16 processes OFDM encoded data symbols that include the information of interest. In either case, the receiver 16 uses an estimate of the channel matrix, $\hat{H}$, to resolve each data vector from the data transmission.

The channel estimation matrix, $\hat{H}$, is generated from sounding data transmitted from the transmitter 12. In particular, the transmitter 12 may utilize high throughput, long training fields (HT-LTF), which are periodically generated and transmitted from the transmitter 12 to the receiver 16. Each HT-LTF includes a plurality of training symbols, which are used by the receiver 16 to generate the channel estimation matrix, $\hat{H}$. Generally, the channel estimation matrix is generated at the beginning of a data transmission, such as the beginning of the transmission of a data packet, and reset for subsequent transmissions (e.g., reset for each subsequent data packet). The channel estimation matrix is also generally used to develop the steering matrix for beamforming.

As is generally known, beamforming or beamsteering typically includes applying appropriate phases and/or gains and/or phase rotations to the various signals as sent through the multiple transmitter antennas 14A-14N, in a manner which causes the signals sent from the different transmitter antennas 14A-14N to constructively interact (add in phase) in certain predetermined directions and to deconstructively interact (cancel) in other directions. Thus, beamsteering typically produces a beam pattern having high gain regions (referred to as high gain lobes) in various predetermined directions and low gain regions (typically referred to as nulls) in other directions. The use of beamforming techniques in a MIMO system enables a signal to be sent with high gain (as compared to an omni-directional antenna) in certain directions, and to be sent with low gain (as compared to an omni-directional antenna) in other directions. Thus, in the MIMO system 10 of FIG. 1, beamforming may be used to enhance signal directivity towards the receiver antennas 18A-18M, which improves the SNR of the transmissions and results in more reliable transmissions. In this case, the beamforming technique will generally form high gain lobes in the direction of propagation at which the highest gain is desired, and in particular in the directions of propagation from the transmitter 12 to each of the receiver antennas 18A-18M of the receiver 16.

To implement beamforming in the transmitter 12, the steering matrix calculation unit 28 may determine or calculate a set of matrix coefficients (referred to herein as a steering matrix or precoding matrix) which are used by the precoding block or beamforming network 24 to condition the signals being transmitted by the antennas 14A-14N. If desired, the steering matrix for any particular frequency channel of the MIMO system 10 may be determined by the steering matrix calculation unit 28 based on the CSI determined for that channel (wherein the CSI is usually developed by and sent from the receiver 16 but may instead be developed from signals sent from the receiver 16 to the transmitter 12 in the reverse link as an estimate of the forward link).

However, as is known, to actually determine the CSI or other measured description of the forward channel, i.e., for the channel from the transmitter 12 to the receiver 16, the transmitter 12 generally sends a known control or test signal to the receiver 16 (e.g., the signal $C_{x1}$) and the receiver 16 may then determine the CSI or other measured description of the forward channel and send this information back to the transmitter 12 as part of a payload of a transmission, for example as a channel estimation matrix H. In the event of explicit beamforming, in this case, the transmitter 12 first sends a test or control signal to the receiver 16 which then determines a measured description of the forward channel and sends this description of the forward channel from the receiver 16 back to the transmitter 12. This characterization of the forward channel thereby requires, each time the steering matrix is computed, multiple communications between the transmitter 12 and the receiver 16 so as to enable the transmitter 12 to obtain the CSI or other description of the forward channel used to develop the steering matrix to be used in the forward channel.

Development of the steering matrix can be computationally expensive and may require feedback (in the form of the CSI, and, more specifically, in the form of a channel estimation matrix A) from the receiver 16 to the transmitter 12. especially when there are numerous transmitter antennas and receiver antennas. When performing beamforming, it is optimal to develop the steering matrix using various known computational techniques based on the existence of all of the receiver and transmitter antennas. Such a steering matrix generally creates a transmit beam pattern having a high gain lobe directed to some combination of the receiver antennas as determined from, for example, the CSI. However, as the number of receiver and transmitter antennas increases, the required feedback and number of calculations that need to be performed to develop the optimal steering matrix increases significantly (e.g., exponentially).

Explicit beamforming involves feeding back steering vectors from the beamformee to the beamformer device. Steering vectors are often computed at the beamformee device through singular value decomposition, which may have an inherent column angle uncertainty. On top of this, compression of steering vectors removes the angle corresponding to the last row of the steering matrix. This causes a column angle uncertainty. Further, several other factors such as time domain Cyclic Shift Diversity (CSD), per transmit/receive chain filter delays, channel variations, etc. may cause a row angle uncertainty. These uncertainties of steering matrices across tones impact steering matrix interpolation, which degrades steering performance and also makes the steered channel non-smooth. That is that the channel characteristics do not vary smoothly across the different frequency tones used as expected, but rather can jump significantly across tones due to the column angle uncertainty. Ensuring smoothness of the steered channel can enable channel smoothing at the receiver side, leading to additional performance improvement. The embodiments described herein address this issue.

Embodiments of a technique will be described that performs both row and angle alignment of steering matrices across tones in order to improve steering matrix interpolation when the steering matrix has both row and column angle discontinuities that may occur due to compressing steering information for the channel. Improvement in the quality of steering matrix interpolation helps to ensure that the steered channel is free of discontinuities that may result from compressing steering information for the channel (not considering the effect of receiver noise). Ensuring that the underlying steered channel is discontinuity-free further enables one to perform channel smoothing on the steered channel, which results in additional performance gain on top of beamforming.

The beamformer receives the steering matrices from the beamformee on feedback tones as described above. Let the steering matrices on two consecutive feedback tones be: $Q_k$ and $Q_{k+Ng}$. When compared to $Q_k$, $Q_{k+Ng}$ may appear have random phasors applied on its columns (SVD implementation dependent) that may be modeled as a post multiplication with diagonal matrix $\Lambda(1, e^{j\theta_{k,1}}, \ldots, e^{j\theta_{k,N}})$ that has unit phasors $1, e^{j\theta_{k,1}}, \ldots, e^{j\theta_{k,N}}$ on its diagonal.

Also, row-dependent delay may be modeled as pre-multiplication with a diagonal matrix $\Lambda(1, e^{j\phi_1}, \ldots, e^{j\phi_M})$ having elements $1, e^{j\phi_1}, \ldots, e^{j\phi_M}$ on its diagonal. Note that the first set of angles (i.e. $\phi_1, \ldots, \phi_M$), do not depend on k (i.e., on a specific tone) while the second set of angles (i.e. $\theta_{k,1}, \ldots, \theta_{k,N}$) depend on k, meaning that these are just some random angles applied on a tone to tone basis. So, the following may be written:

$$Q_{k+Ng} = \Lambda(1, e^{j\phi_1}, \ldots, e^{j\phi_M}) Q_{k+Ng}^{ideal} \Lambda(1, e^{j\theta_{k,1}}, \ldots, e^{j\theta_{k,N}}),$$

where $Q_{k+Ng}^{ideal}$ and $Q_k$ are coherent. $Q_{k=Ng}^{ideal}$ may be thought of as the steering matrix at tone k+Ng in the absence of transmit dependent delay and under ideal SVD that produces frequency coherent steering vectors.

In order to improve interpolation, it is desired to determine $Q_{k+Ng}^{ideal}$ using $Q_{k+Ng}$. From the above discussion, the following may be written:

$$Q_{k+Ng}^{ideal} = \Lambda(1, e^{-j\phi_1}, \ldots, e^{-j\phi_M}) Q_{k+Ng} \Lambda(1, e^{-j\theta_{k,1}}, \ldots, e^{-j\theta_{k,N}}).$$

Now, a modified joint optimization problem may be defined as follows:

$$\min \|Q_k - Q_{k+Ng}^{ideal}\|_F = \min_{D1,D2} \|Q_k - D_1 Q_{k+Ng} D_2\|_F.$$

The object of the optimization problem is to find $D_1$ and $D_2$. Note that $D_1$ and $D_2$ are diagonal matrices having unit phasors on their diagonals and represent the apparent random phases and delays applied as described above.

When $D_1$ is known, the optimum $D_2^{opt}$ is obtained by finding the column-aligning angles, $$\psi_i^* = \underset{\psi_i}{\mathrm{argmax}}\, \mathrm{Re}\{((q_k)^i e^{j\psi_i})^H (D_1 Q_{k+Ng})^i\},$$

where the notation $(W)^i$ denotes the ith column of a matrix $W$. A solution to $\psi_i^*$ thus may be obtained as $\psi_i^* = \mathrm{angle}\,(((q_k)_i)^H (D_1 Q_{k+Ng})_i)$ that may be used to arrive at the estimate $D_2^{opt}$ as:

$$D_2^{opt} = \mathrm{diag}(\exp\{-j\, angle(\mathrm{diag}(Q_k^H D_1 Q_{k+Ng}))\}).$$

On the other hand, when $D_2$ is known, the optimum $D_1^{opt}$ may be obtained using a similar line of analysis, i.e. by first finding the row-aligning angles $$\varphi_i^* = \underset{\varphi_i}{\mathrm{arg\,max}}\, \mathrm{Re}\,\{(Q_{k+ng} D_2)_i ((q_k)_i e^{j\varphi_i})^H\},$$

where the notation $(W)_i$ denotes the ith row of a matrix $W$. Note that this problem is analogous to the one for finding the column-aligning angles, and hence the solution is given as $\varphi_i^* = \mathrm{angle}\,(Q_{k+Ng} D_2)_i ((q_k)_i)^H)$, from which $D_1^{opt}$ may be determined as:

$$D_1^{opt} = \mathrm{diag}(\exp\{-j\, angle(\mathrm{diag}(Q_{k+Ng} D_2 Q_k^H))\})$$

Because both $D_1$ and $D_2$ are unknown the following algorithm is performed using iterative steps that may be used to determine their values.

Algorithm to find $D_1^{opt}$ and $D_2^{opt}$:

Initialize $D_1 = I_M$ and $D_2 = I_N$
For n in 1 to $N_{iter}$:
   $D_2 = \mathrm{diag}(\exp\{-j\, \mathrm{angle}(Q_k^H D_1 Q_{k+Ng}))\})$
   $D_1 = \mathrm{diag}(\exp\{-j\, \mathrm{angle}(Q_{k+Ng} D_2 Q_k^H))\})$
$D_1^{opt} = D_1$
$D_2^{opt} = D_2$ The algorithm begins by first initializing $D_1$ and $D_2$ to identity matrices. Then for a $N_{iter}$ number of iterations, $D_2$ is calculated as shown from $D_1$, and $D_1$ is calculated as shown from $D_2$. This causes the values of $D_1$ and $D_2$ to converge to the optimized values. The value for $N_{iter}$ may be set based upon the amount of processing resources available or set to a specific number of interactions that may be determined by simulation or experimentation.

In the next step, the following are calculated: $\widetilde{Q_{k+Ng}^{ideal}} = D_1^{opt} Q_{k+Ng} D_2^{opt}$ and $\alpha = -\mathrm{angle}(\mathrm{diag}(D_1^{opt}))$. It is noted that that $\alpha$ is a vector of angles. At this point, the steering matrix $Q_{k+Ng}$ is replaced with $\widetilde{Q_{k+Ng}^{ideal}}$. In an alternative embodiment, in the above algorithm, some implementations may initialize $D_1$ according to channel characteristic values Now the steering matrix interpolation calculations will be described. Interpolation of the steering matrices at tones between feedback tones $Q_k$ and $Q_{k+Ng}$ (i.e. interpolation for $Q_k+1, \ldots, Q_{k+Ng-1}$) is then performed using $Q_k$, $Q_{k+Ng}$ and $\alpha$ as:

$$Q_{k+r} = \mathrm{diag}\left(\exp\left(j\frac{r}{Ng}\alpha\right)\right) \times \left(\frac{Ng-r}{Ng}Q_k + \frac{r}{Ng}Q_{k+Ng}\right)$$

$$= \mathrm{diag}\left(\exp\left(j\frac{r}{Ng}\alpha\right)\right) \times \left\{Q_k + \frac{r}{Ng}(Q_{k+Ng} - Q_k)\right\}.$$

It is noted that $$\mathrm{diag}\left(\exp\left(j\frac{r}{Ng}\alpha\right)\right)$$

is a diagonal matrix with elements $$\left\{\exp\left(j\frac{r}{Ng}\alpha_1\right), \ldots, \exp\left(j\frac{r}{Ng}\alpha_{N_{row}}\right)\right\}$$

on its diagonals. Further, a linear interpolation is illustrated above, but other interpolation methods may be used as well.

The aligned and interpolated matrix is then used by the beamformer to steer packets to the beamformee. This helps to make the resulting steered channel coefficients smooth, which in turn allows the beamformee to perform channel smoothing so as to further reduce packet error rate.

Figure 2:
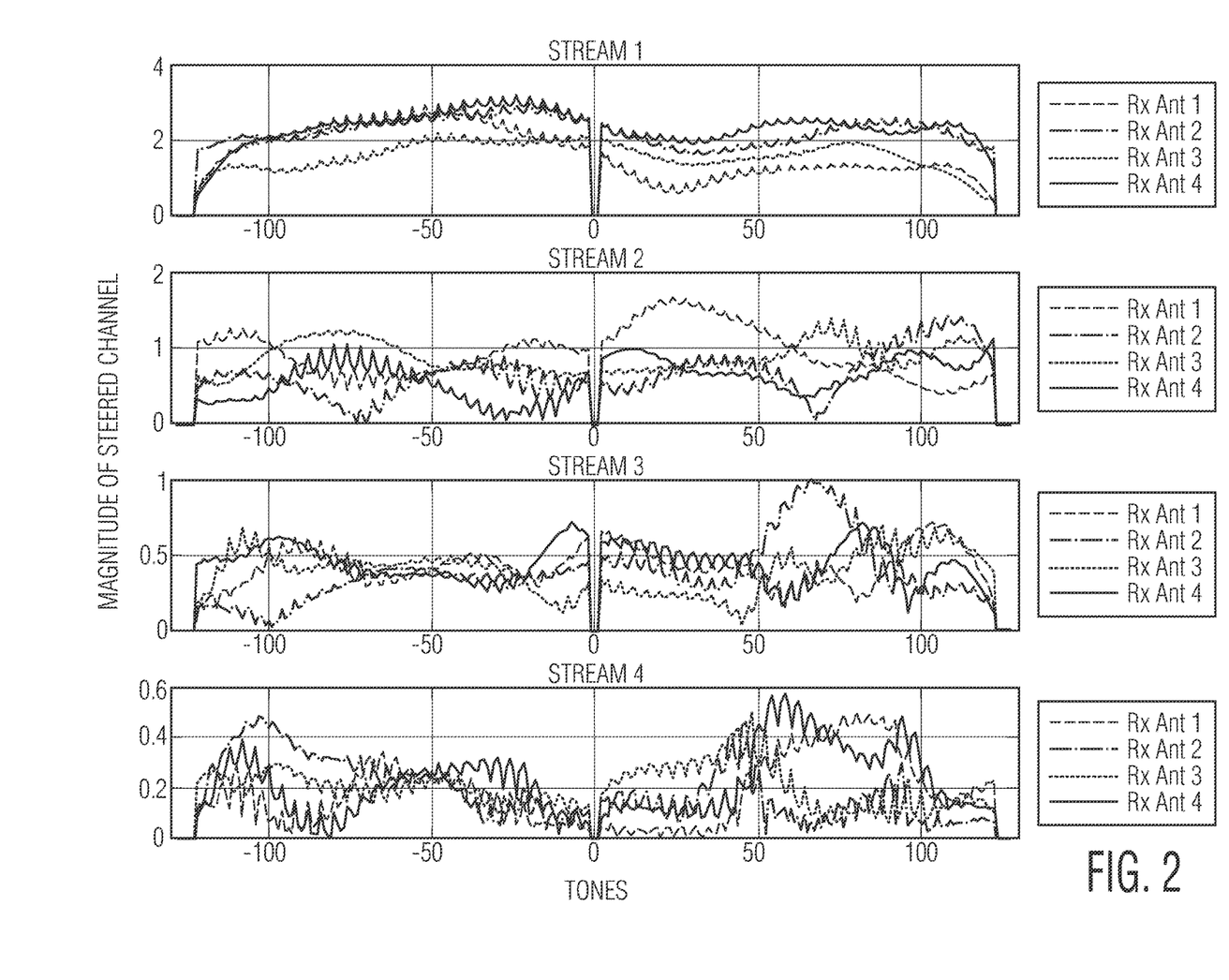
FIG. 2 illustrates example simulation results of the steered channel smoothness with only column-angle alignment.

FIG. 2 illustrates simulation results of the steered channel smoothness with only column-angle alignment. In this example the number of transmit antennas is $N_{Tx}=4$ and the number of receive antennas is $N_{Rx}=4$. The plots show the magnitude of the steered channel versus tone number for each of the four different receive antennas. Four plots are shown, with a plot for each of the four transmit streams. As can be seen, the plots are not very smooth with significant variations from tone to tone.

Figure 3:
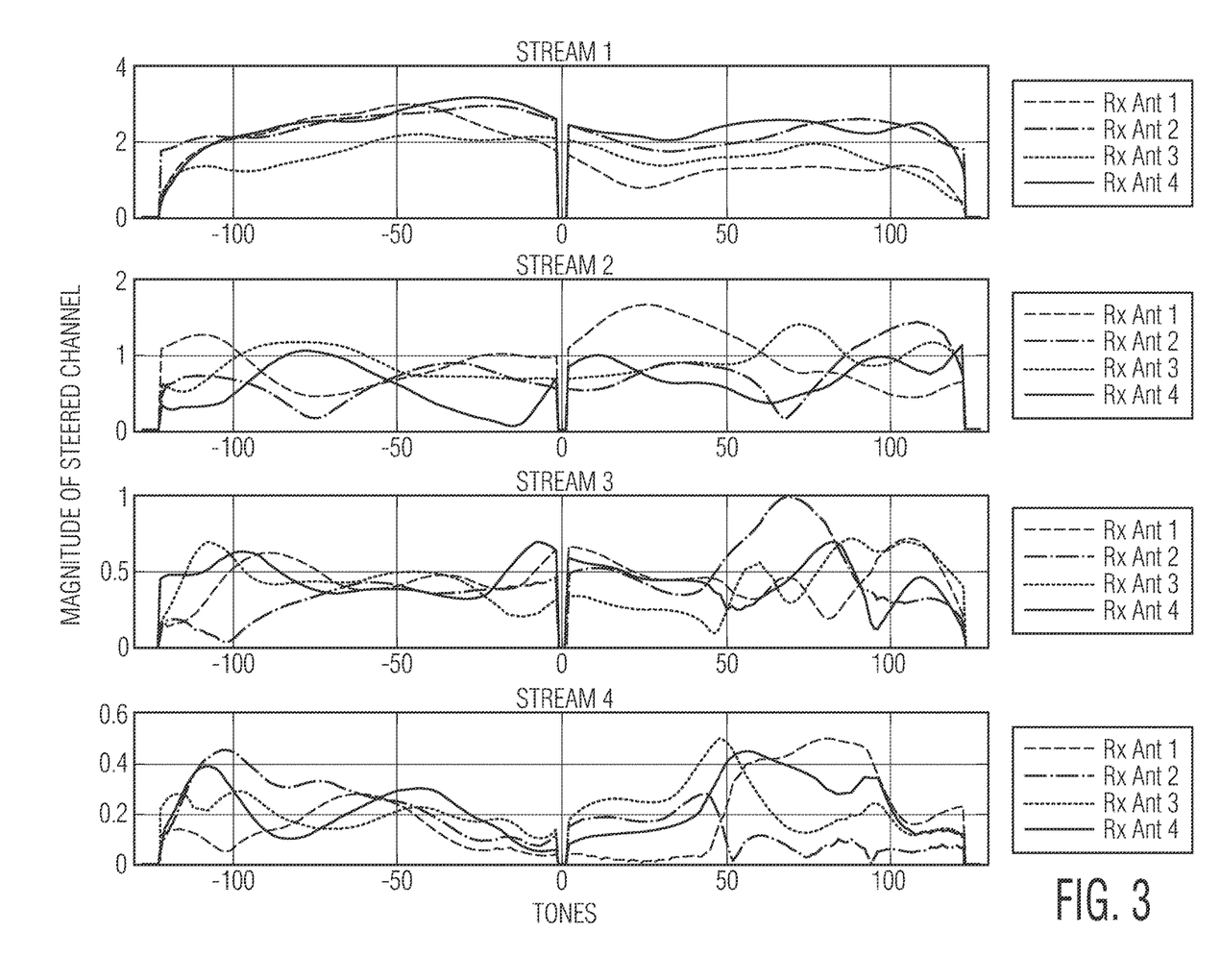
FIG. 3 illustrates example simulation results of the steered channel smoothness with bi-dimensional alignment (i.e., both row and column alignment).

FIG. 3 illustrates simulation results of the steered channel smoothness with bi-dimensional alignment (i.e., both row and column alignment). In this example the number of transmit antennas is again $N_{Tx}=4$ and the number of receive antennas is again $N_{Rx}=4$. The plots show the magnitude of the steered channel versus tone number for each of the four different receive antennas. Four plots are shown, with a plot for each of the four transmit streams. As can be seen, the plots illustrate a smoothness from tone to tone. This illustrates one of the benefits of the bi-dimensional row and column alignment techniques disclosed herein.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, the term "non-transitory machine-readable storage medium" will be understood to exclude a transitory propagation signal but to include all forms of volatile and non-volatile memory. When software is implemented on a processor, the combination of software and processor becomes a specific dedicated machine.

Because the data processing implementing the embodiments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having." and/or the like are intended to be open-ended terms. Further, the phrase "based on" is intended to mean "based, at least in part, on" unless explicitly stated otherwise.

We claim:

1. A transmitter, comprising:
a plurality of antennas; and
a controller configured to:
receive a first steering matrix for a first feedback tone;
receive a second steering matrix for a second feedback tone;
estimate an ideal second steering matrix based on the second steering matrix including:
estimating a set of random phasors applied to columns of the second steering matrix; and
estimating a set of row-dependent delays applied to rows of the second steering matrix;
estimate a vector of angles based upon the estimated set of random phasors; and
calculate a steering matrix for a tone between the first feedback tone and the second feedback tone by interpolating between the first steering matrix and the ideal second steering matrix based upon the estimated vector of angles.

2. The transmitter of claim 1, wherein estimating a set of random phasors applied to the columns of the second feedback matrix includes estimating a diagonal matrix $\Lambda(1, e^{j\theta_{k,1}}, \ldots, e^{j\theta_{k,N}})$ that has unit phasors $1, e^{j\theta_{k,1}}, \ldots, e^{j\theta_{k,N}}$ on its diagonal where $\theta_{k,1}$ is a phase angle, k is a tone index, and N is the number rows and columns in the diagonal matrix.

3. The transmitter of claim 1, wherein estimating a set of row-dependent delays applied to the rows of the second feedback matrix includes estimating a diagonal matrix $\Lambda(1, e^{j\phi_1}, \ldots, e^{j\phi_M})$ having elements $1, e^{j\phi_1}, \ldots, e^{j\phi_M}$ on its diagonal where $\phi_M$ is a phase angle and M is the number of rows or columns in the diagonal matrix.

4. The transmitter of claim 1, wherein estimating the ideal second steering matrix further includes:
initializing a first diagonal matrix;
initializing a second diagonal matrix;
repeating for $N_{iter}$ number of iterations:
calculating a value of the second matrix based upon the first steering matrix, the second steering matrix, and the first matrix; and
calculating a value of the first matrix based upon the first steering matrix, the second steering matrix, and the second matrix; and
calculating the ideal second beam steering matrix based upon the second steering matrix, a final calculated value of the first matrix, and a final calculated value of the second matrix,
wherein the first matrix corresponds to the set of row-dependent delays applied to the rows of the second feedback matrix, and
wherein the second matrix corresponds to the set of random phasors applied to the columns of the second feedback matrix.

5. The transmitter of claim 4, wherein
calculating a value of the second matrix based upon the first steering matrix, the second steering matrix, and the first matrix includes calculating $$D_2 = \mathrm{diag}(\exp\{-j\,\mathrm{angle}(\mathrm{diag}(Q_k^H D_1 Q_{k+Ng}))\}),$$

where $D_2$ is the second matrix, $D_1$ is the first matrix, $Q_k^H$ is a conjugate transpose of the first steering matrix, and $Q_{k+Ng}$ is the second steering matrix, calculating a value of the first matrix based upon the first steering matrix, the second steering matrix, and the second matrix includes calculating $$D_1 = \mathrm{diag}(\exp\{-j\,\mathrm{angle}(\mathrm{diag}(Q_{k+Ng}D_2Q_k^H))\}),$$

and calculating the ideal second beam steering matrix based upon the second steering matrix, the first matrix, and the second matrix includes calculating $$Q_{k+Ng}^{\overline{ideal}} = D_1^{opt} Q_{k+Ng} D_2^{opt},$$

where $Q_{k+Ng}^{\overline{ideal}}$ is the ideal second beam steering matrix, $D_1^{opt}$ is a final value of $D_1$ after the $N_{iter}$ number of iterations, $D_2^{opt}$ a final value of $D_2$ after the $N_{iter}$ number of iterations, and Ng is the number of tones between the first feedback tone and the second feedback tone.

6. The transmitter of claim 4, wherein the first matrix and the second matrix are initialized to identity matrices.

7. The transmitter of claim 4, wherein the first matrix is initialized to values based upon channel characteristic values and the second matrix is initialized to an identity matrix.

8. The transmitter of claim 1, wherein interpolating between the first steering matrix and the ideal second steering matrix based upon the estimated vector of angles is done using a linear interpolation.

9. The transmitter of claim 1, wherein calculating a steering matrix for a tone between the first feedback tone and the second feedback tone includes calculating $$Q_{k+r} = \mathrm{diag}\left(\exp\left(j\frac{r}{Ng}\alpha\right)\right) \times \left\{Q_k + \frac{r}{Ng}(Q_{k+Ng}^{\overline{ideal}} - Q_k)\right\},$$

where r is an integer so that k+r is the index of the tone between the first feedback tone and the second feedback tone and α is the vector of estimated angles.

10. The transmitter of claim 1, wherein estimating the vector of angles based upon the estimated set of random phasors is calculated as $$\alpha = -\mathrm{angle}(\mathrm{diag}(D_1^{opt})),$$

where α is the vector of estimated angles and $D_1^{opt}$ is a final value of $D_1$ after the $N_{iter}$ number of iterations.

11. A method for producing a steering matrix, comprising:
receiving a first steering matrix for a first feedback tone;
receiving a second steering matrix for a second feedback tone;
estimating an ideal second steering matrix based on the second steering matrix including:
  estimating a set of random phasors applied to columns of the second steering matrix; and
  estimating a set of row-dependent delays applied to rows of the second steering matrix;
estimating a vector of angles based upon the estimated set of random phasors; and
calculating a steering matrix for a tone between the first feedback tone and the second feedback tone by interpolating between the first steering matrix and the ideal second steering matrix based upon the estimated vector of angles.

12. The method of claim 11, wherein estimating a set of random phasors applied to the columns of the second feedback matrix includes estimating a diagonal matrix $\Lambda(1, e^{j\Theta_{k,1}}, \ldots, e^{j\Theta_{k,N}})$ that has unit phasors $1, e^{j\Theta_{k,1}}, \ldots, e^{j\Theta_{k,N}}$ on its diagonal where $\Theta_{k,1}$ is a phase angle, k is a tone index, and N is the number of rows and columns in the diagonal matrix.

13. The method of claim 11, wherein estimating a set of row-dependent delays applied to the rows of the second feedback matrix includes estimating a diagonal matrix $\Lambda(1, e^{j\phi_1}, \ldots, e^{j\phi_M})$ having elements $1, e^{j\phi_1}, \ldots, e^{j\phi_M}$ on its diagonal where $\phi_M$ is a phase angle and M is the number of rows or columns in the diagonal matrix.

14. The method of claim 11, wherein estimating the ideal second steering matrix further includes:
initializing a first diagonal matrix;
initializing a second diagonal matrix;
repeating for $N_{iter}$ number of iterations:
  calculating a value of the second matrix based upon the first steering matrix, the second steering matrix, and the first matrix; and
  calculating a value of the first matrix based upon the first steering matrix, the second steering matrix, and the second matrix; and
calculating the ideal second beam steering matrix based upon the second steering matrix,
a final calculated value of the first matrix, and a final calculated value of the second matrix,
wherein the first matrix corresponds to the set of row-dependent delays applied to the rows of the second feedback matrix, and
wherein the second matrix corresponds to the set of random phasors applied to the columns of the second feedback matrix.

15. The method of claim 14, wherein
calculating a value of the second matrix based upon the first steering matrix, the second steering matrix, and the first matrix includes calculating $$D_2 = \mathrm{diag}(\exp\{-j\,\mathrm{angle}(\mathrm{diag}(Q_k^H D_1 Q_{k+Ng}))\}),$$

where $D_2$ is the second matrix, $D_1$ is the first matrix, $Q_k^H$ is a conjugate transpose of the first steering matrix, and $Q_{k+Ng}$ is the second steering matrix,
calculating a value of the first matrix based upon the first steering matrix, the second steering matrix, and the second matrix includes calculating $$D_1 = \mathrm{diag}(\exp\{-j\,\mathrm{angle}(\mathrm{diag}(Q_{k+Ng}D_2Q_k^H))\}),$$

and calculating the ideal second beam steering matrix based upon the second steering matrix, the first matrix, and the second matrix includes calculating $$Q_{k+Ng}^{\overline{ideal}} = D_1^{opt} Q_{k+Ng} D_2^{opt},$$

where $Q_{k+Ng}^{ideal}$ is the ideal second beam steering matrix, $D_1^{opt}$ is a final value of $D_1$ after the $N_{iter}$ number of iterations, $D_2^{opt}$ a final value of $D_2$ after the $N_{iter}$ number of iterations, and Ng is the number of tones between the first feedback tone and the second feedback tone.

16. The method of claim 14, wherein the first matrix and the second matrix are initialized to identity matrices.

17. The method of claim 14, wherein the first matrix is initialized to values based upon channel characteristic values and the second matrix is initialized to an identity matrix.

18. The method of claim 11, wherein interpolating between the first steering matrix and the ideal second steering matrix based upon the estimated vector of angles is done using a linear interpolation.

19. The method of claim 11, wherein calculating a steering matrix for a tone between the first feedback tone and the second feedback tone includes calculating $$Q_{k+r} = \text{diag}\left(\exp\left(j\frac{r}{Ng}\alpha\right)\right) \times \left\{Q_k + \frac{r}{Ng}(Q_{k+Ng}^{ideal} - Q_k)\right\},$$

where r is an integer so that k+r is the index of the tone between the first feedback tone and the second feedback tone and $\alpha$ is the vector of estimated angles.

20. The method of claim 11, wherein estimating the vector of angles based upon the estimated set of random phasors is calculated as $$\alpha = -\text{angle}(\text{diag}(D_1^{opt})),$$

where $\alpha$ is the vector of estimated angles and $D_1^{opt}$ is a final value of $D_1$ after the $N_{iter}$ number of iterations.

* * * * *